United States Patent [19]

Ortiz

[11] Patent Number: 4,748,531

[45] Date of Patent: May 31, 1988

[54] COMPRESSOR TERMINAL BLOCK AND OVERLOAD PROTECTOR ASSEMBLY

[75] Inventor: Arturo L. Ortiz, Tecumseh, Mich.

[73] Assignee: Tecumseh Products Company, Tecumseh, Mich.

[21] Appl. No.: 16,842

[22] Filed: Feb. 20, 1987

[51] Int. Cl.[4] .......... H02H 5/04

[52] U.S. Cl. .......... 361/24; 361/26; 361/105; 361/426; 361/386

[58] Field of Search .......... 361/24, 25, 26, 105, 361/426, 386, 22

[56] References Cited

U.S. PATENT DOCUMENTS

| | | | |
|---|---|---|---|
| 2,094,386 | 9/1937 | Veinott | 175/294 |
| 2,425,668 | 8/1947 | Bolesky | 172/279 |
| 2,517,654 | 10/1951 | Beard et al. | 200/122 |
| 2,874,344 | 2/1959 | Slocum | 318/221 |
| 3,012,159 | 12/1961 | Druesedow | 310/71 |
| 3,168,661 | 2/1965 | Rini | 310/68 |
| 3,248,627 | 4/1966 | Shockroo et al. | 318/221 |
| 3,293,519 | 12/1966 | Dresser | 318/221 |
| 3,320,505 | 5/1967 | Miller | 318/221 |
| 3,350,587 | 10/1967 | Turk | 310/71 |
| 3,351,790 | 11/1967 | Linkous | 310/68 |
| 3,586,910 | 6/1971 | Sauber | 310/71 X |
| 3,619,641 | 11/1971 | Ballard | 307/149 |
| 3,694,717 | 9/1972 | Prouty et al. | 318/221 |
| 3,988,709 | 10/1976 | McKinnon et al. | 338/57 |
| 4,037,316 | 7/1977 | Stoll | 29/622 |
| 4,084,202 | 11/1978 | Stoll | 361/24 |
| 4,237,508 | 12/1980 | Woods et al. | 361/24 |
| 4,237,510 | 12/1980 | Thompson, Jr. et al. | 361/24 |
| 4,241,370 | 12/1980 | DeFilippis et al. | 361/24 |
| 4,252,394 | 2/1981 | Miller | 339/94 |
| 4,319,299 | 3/1982 | Woods et al. | 361/24 |
| 4,325,012 | 4/1982 | Schaefer | 318/786 |
| 4,327,481 | 5/1982 | Woods | 29/619 |
| 4,334,162 | 6/1982 | Haag et al. | 310/68 |
| 4,347,412 | 8/1982 | Mihara et al. | 200/42 |
| 4,408,244 | 10/1983 | Weible | 361/24 |
| 4,422,120 | 12/1983 | Kobayashi et al. | 361/24 |
| 4,467,385 | 8/1984 | Bandoli et al. | 361/24 |
| 4,499,517 | 2/1985 | Lisauskas | 361/24 |
| 4,508,987 | 4/1985 | Ladusaw | 310/68 |

*Primary Examiner*—A. D. Pellinen
*Assistant Examiner*—Derek S. Jennings
*Attorney, Agent, or Firm*—Jeffers, Hoffman & Niewyk

[57] ABSTRACT

A terminal block and overload protector for a compressor assembly for connection to the terminal pin assembly of a compressor located on the inside wall of a compressor casing. The assembly includes a housing with three apertures therein into which three of the terminal pins are disposed. Electrical connector clips are disposed in the housing for connection to the terminal pins. The housing also includes a space in which a motor protector is secured. The motor protector has two terminal pins which are secured to slip-on quick-connect terminals. The motor protector housing has a third connector clip secured thereto. Each of the three connector clips has a knurled inside surface for gripping and retaining of the respective terminal pins.

10 Claims, 3 Drawing Sheets

COMPRESSOR TERMINAL BLOCK AND OVERLOAD PROTECTOR ASSEMBLY

BACKGROUND OF THE INVENTION

This invention relates generally to a terminal block and motor protector holder assembly for a hermetic compressor of a refrigeration system. More particularly, the invention relates to a combined terminal block and motor protection holder for a hermetic compressor which is mounted inside the compressor casing.

Hermetic compressors are well known in the prior art and generally comprise a casing, a motor mounted inside the casing and a compressor unit which is driven by the motor. In high side hermetic compressors the compressed refrigerant is discharged from the compressor unit into the casing and then flows over the motor windings to cool the same. The compressed refrigerant then flows through a discharge tube out of the compressor casing and into a condenser for cooling of the compressed refrigerant. It is imperative, for the proper operation and protection of a hermetic compressor, that the temperatures of the motor windings not exceed a predetermined temperature level. Since the compressed refrigerant is used to cool the motor windings, the temperature of the refrigerant, after flowing over the motor windings, gives an indication of the temperature of the motor windings. Thus, it is important to monitor the temperature of the compressed refrigerant after it flows over the motor windings and to shut down the compressor if the temperature of the refrigerant exceeds a certain predetermined level. In a hermetic compressor, electrical connections to the compressor motor from a supply of electric energy must also be made. These conductors must be routed through the wall of the compressor casing to connect the motor windings to an external supply of electric energy.

Prior art hermetic compressors have provided various systems for connecting the supply of electric energy to the motor windings and for protecting the motor windings from excessive heating. Conventionally, a terminal assembly is welded to the compressor casing and a temperature sensitive motor protector is mounted on a mounting bracket inside the casing. The power supply is connected to the terminal assembly and leads are then used to connect the terminal assembly to the motor windings and to the motor protector. Thus, these prior art systems have used relatively complex and costly electrical interconnection and protector systems. Generally, a total of six (6) leads must be used for making the interconnections in such prior art systems. It is therefore desired to reduce the number of parts for providing the internal electrical connections in a hermetic compressor, to provide a convenient motor protector holder to improve the reliability of the compressor and to reduce the cost of the compressor.

Another problem with prior art compressor motor protection systems has been that, in some situations, the protectors have been responsive to rapid fluctuations in the temperature of the compressed refrigerant, which fluctuations were not indicative of an overall excessive temperature condition. In still other prior art motor protection systems, the motor protector has been too unresponsive to temperature variations as the protector was not located in a position wherein it sensed the average temperature of the discharged compressed refrigerant and therefore gave an incorrect indication of the temperature of the motor windings.

In one prior art connector block and protector holder assembly, the motor protector is located on the outside of the terminal block and the entire terminal block and protector assembly is connected to the terminal pin assembly which is located on the inside wall of the compressor casing. However, since in this prior art structure, the terminal block and protector assembly is not located in the vicinity of the inlet to the compressor discharge tube for discharging compressed refrigerant from the compressor, the protector was not sensitive to the average temperature of the compressed refrigerant. Furthermore, by mounting the protector on the outside of the terminal block housing, the protector was likely to give an incorrect indication of the temperature of the compressed refrigerant as the protector was likely to indicate the temperature of spikes of hot refrigerant rather than the average temperature of the compressed refrigerant. It is therefore desired to provide a combined terminal block and overload protector holder assembly for a hermetic compressor wherein the overload protector is insulated or shielded from direct contact with hot spikes of compressed refrigerant. It is furthermore desired to provide such an assembly wherein the number of electrical connectors and leads is reduced to a minimum thereby improving the reliability and reducing the cost of a hermetic compressor.

SUMMARY OF THE INVENTION

The present invention, in one form thereof, comprises a terminal block and overload protector holder for a compressor assembly for connecting the motor run and start windings to a supply of electric energy. The holder includes a housing having a plurality of apertures therein through which the pins of a terminal connector block extend. The housing also includes two terminal clips which are respectively connected to first ends of two leads the other ends of which are respectively connected to first respective ends of the motor run and start winding. The pins are respectively received in and retained by the two terminal clips. A third terminal pin is received in and retained by a third terminal clip which is directly secured to a motor protector. The motor protector is secured in the housing and is therefore shielded from direct impact by hot compressed refrigerant. The motor protector also includes two quick-connect terminals which are electrically connected to a pair of leads the other ends of which are connected to the other respective ends of the motor start and run windings.

The present invention, in one form thereof, comprises a combined terminal block and motor protector holder which may be directly assembled to the terminal pin assembly of the compressor inside the compressor casing. The terminal clips are secured to the housing so that the entire assembly is removeably secured to the terminal pin assembly of the compressor. The terminal block includes three openings through which three terminal pins extend. Two of the terminal pins are removeably connected to terminal clips which in turn are secured to respective first ends of a pair of leads. The other ends of the pair of leads are respectively connected to first ends of the compressor motor run and start windings. The third terminal pin is removeably secured to a connector clip which in turn is secured to a motor protector. The motor protector is housed in the terminal block. Two further leads with slip-on, quick-connect terminals are secured to two further quick-connect terminals on the motor protector. The other ends of these further two leads are connected to the other ends of the run and start windings.

One advantage of the present invention is that relatively few parts are used for the terminal block and protector holder assembly thereby improving the reliability of the compressor and decreasing its cost.

A further advantage of the present invention is that by housing the motor protector in the terminal block housing, the motor protector is shielded from spikes of compressed refrigerant and therefore will give an indication of the average temperature of the refrigerant flowing through the compressor.

Another advantage of the present invention is that, by placing the terminal block and protector assembly near the discharge tube in the compressor casing, virtually all of the refrigerant which flows past the windings will flow past the protector and therefore a good indication of the average overall temperature of the motor windings will be provided to the motor protector.

Still another advantage of the present invention is that fewer leads are used to connect the run and start windings to both the terminal pins and to the motor protector then was possible in prior art structures.

The present invention, in one form thereof, comprises a terminal block and overload protector holder assembly for a hermetic compressor for connecting the hermetic motor run and start windings to a source of electric energy. The assembly includes a housing and first and second apertures in the housing to receive two respective terminal pins therein. A pair of connector clips are mounted in the housing in respective alignment with the first and second apertures for respectively receiving the first and second terminal pins therein. The first and second connector clips are adapted to be connected to first and second electrical leads for respective connection to the motor run and start windings of a compressor. A motor protector is secured within the housing. The protector is responsive to both a predetermined temperature and current level for interrupting the supply of electrical power to the run and start windings. The housing has a third aperture. A connector clip is secured to the motor protector and is aligned with the third aperture for receiving and retaining a third terminal pin therein. First and second terminals are electrically connected to the motor protector and are adapted for respective connection to the motor run and start windings.

The present invention, in one form thereof, comprises a terminal block and overload protector holder assembly for a hermetic compressor whereby the compressor motor run and start windings may be connected to a source of electric energy. The assembly includes a pin housing having three elongated openings therein with locking means on respective inner surfaces of the openings. Three holes are disposed in the housing in generally perpendicular alignment with respective ones of the openings and adapted to receive respective pins therein. Three connector clips are adapted to be connected to respective lead wires and have respective resilient tab means laterally outwardly extending therefrom. Each connector clip is removeably receivable in a respective elongated opening and is securable therein when its tab means lockingly engages the locking means of the respective openings. Each connector clip has a pin receiving slot in alignment with the respective opening when the connector clip is removeably secured in the respective opening. A pin retaining means in the slot is adapted to cut into and frictionally engage and retain one of the pins therein, whereby the pins are frictionally retained in respective ones of the connector clips while minimizing the reduction of electrical surface contact between the pins and respective connector clips. The pin retaining means comprises at least two diametrically opposed contact surface areas on the inner surface of each slot, axially aligned with a pin axis, each opposed contact surface area having a plurality of closely spaced knurls thereon. Each knurl comprises a continuous linear raised portion extending substantially perpendicularly to the axial direction of the respective slots, thereby providing a plurality of electrical line contacts between the contact surface areas and the pins. The pin retaining means further comprises the connecting surface area contiguous to and interconnecting the two contact areas. A motor protector holder means is secured to the pin housing and is integral therewith. The motor protector means is secured in the housing and is responsive to a predetermined temperature and current level of a compressor motor for interrupting the supply of electrical power to the compressor run and start windings. One of the connector clips is secured to the motor protector. First and second terminals are electrically connected to the motor protector and are adapted for respective connection to the motor run and start windings.

The present invention, in one form thereof, comprises a hermetic compressor for a refrigeration system including a casing, an electrical motor having run and start windings mounted in the casing, means for compressing a refrigerant in the casing and operatively connected to the motor and means for discharging compressed refrigerant from the compressing means into the casing. A discharge tube is provided which has one open end extending into the housing for conducting compressed refrigerant from the casing. A terminal pin assembly is secured to the casing and has a plurality of pins extending through the wall to the casing. A terminal block including a plurality of apertures and having a plurality of pins respectively extending therethrough is provided. The terminal block is disposed in the casing adjacent the discharge tube. First and second connector clips are disposed in the terminal block and are removeably secured to the first and second of the pins. The first and second leads are respectively connected to the first and second connector clips and to respective first ends of the run and start windings. A motor protector is disposed in the terminal block. A third connector clip is disposed in the terminal block and is secured to the motor protector for electrical contact therewith, the third connector clip being removeably secured to a third of the pins. First and second push on terminals are secured to the motor protector. Third and fourth leads connect the first and second push on terminals to the respective second ends of the run and start windings, whereby the motor protector is exposed to refrigerant gas after said gas has passed over substantially the entire motor run and start windings.

It is an object of the present invention to provide a combined terminal block and motor protector holder.

It is a still further object of the invention to provide an improved terminal block and motor protector holder which reduces the number of leads required for connecting the motor run and start windings to a supply of electric energy.

Yet still another object of the present invention is to provide a combined connector block and motor protector wherein the common connector from the power supply is connected directly to the motor protector by means of a terminal clip.

BRIEF DESCRIPTION OF THE DRAWINGS

The above mentioned and other features and objects of this invention and the manner of attaining them will become more apparent and the invention itself will be better understood by reference to the following description of an embodiment of the invention taken in conjunction with the accompanying drawings, wherein.

Corresponding reference characters indicate corresponding parts throughout the several views of the drawings.

The exemplifications set out here illustrate a preferred embodiment of the invention, in one form thereof, and such exemplifications are not to be construed as limiting the scope of the disclosure or the scope of the invention in any manner.

DETAILED DESCRIPTION OF THE PREFERRED EMBODIMENT

Figure 1:
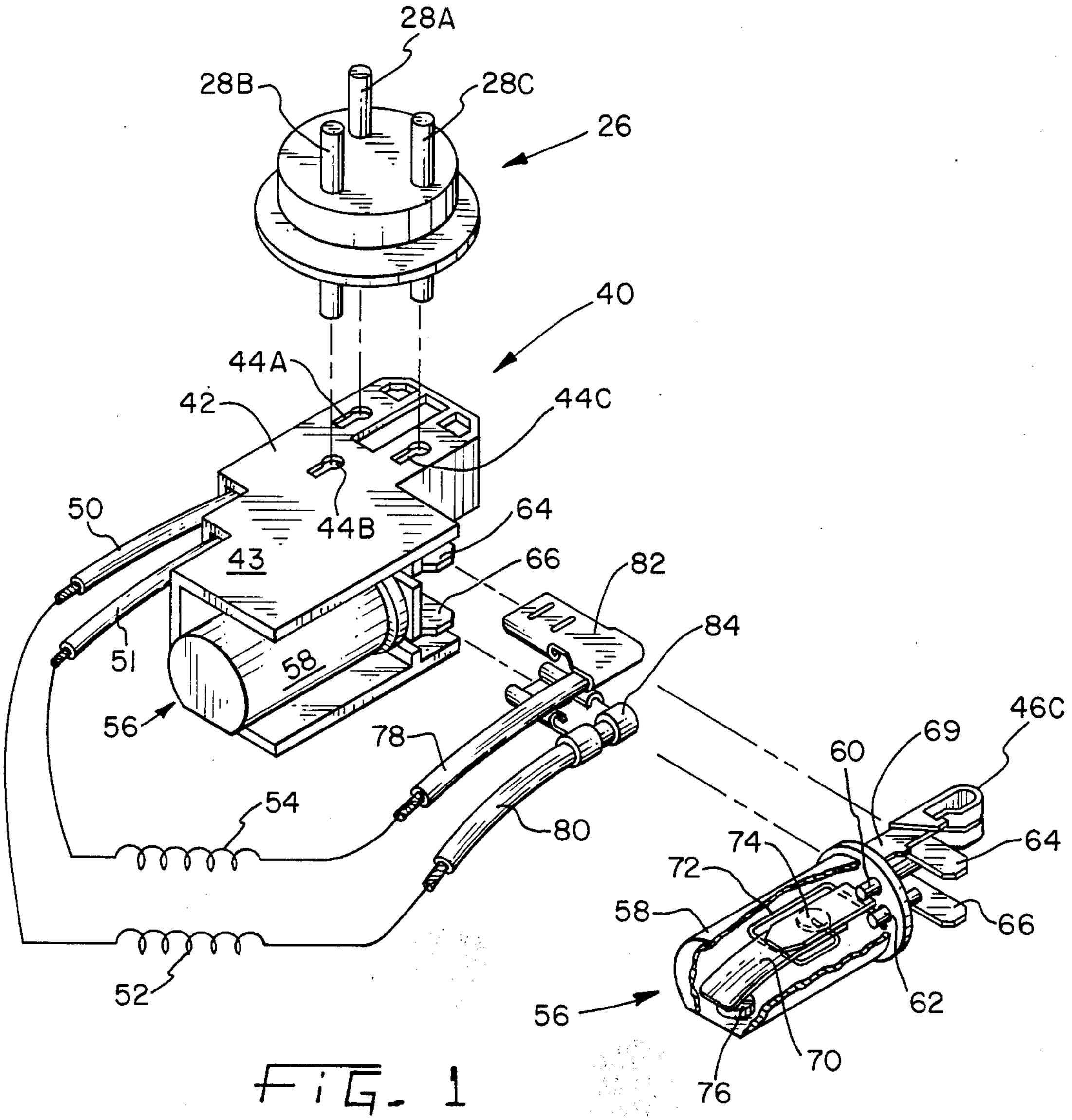
FIG. 1 is a partially exploded drawing of the compressor terminal block and overload protector holder as assembled to the winding connector leads and to the terminal pin cluster.
Figure 3:
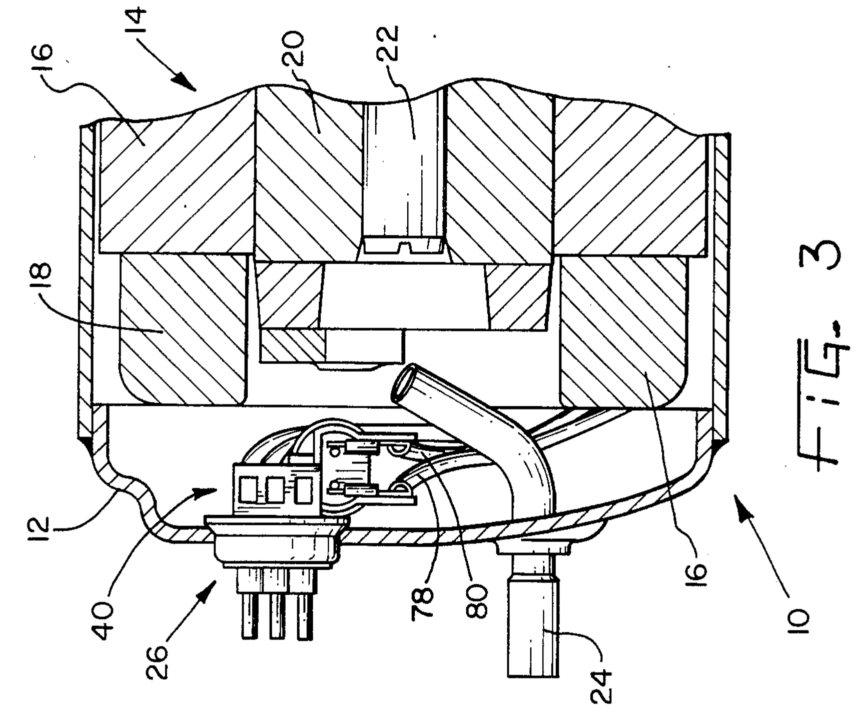
FIG. 3 is an elevational view, in cross section, of a portion of the compressor of FIG. 2.
Figure 2:
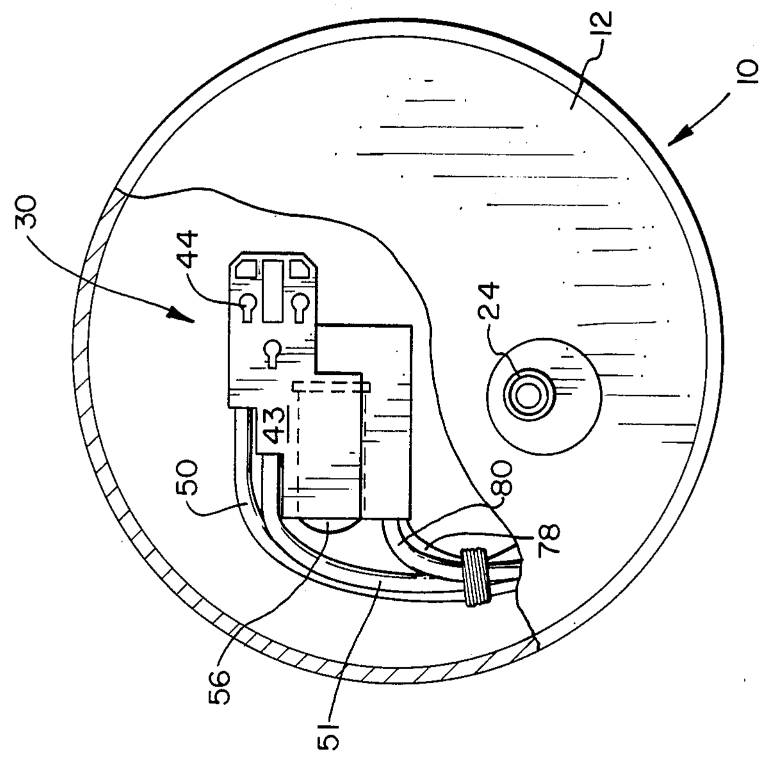
FIG. 2 is a plan view of a compressor, in partial section, showing the assembled terminal block and overload protector holder.
Figure 4:
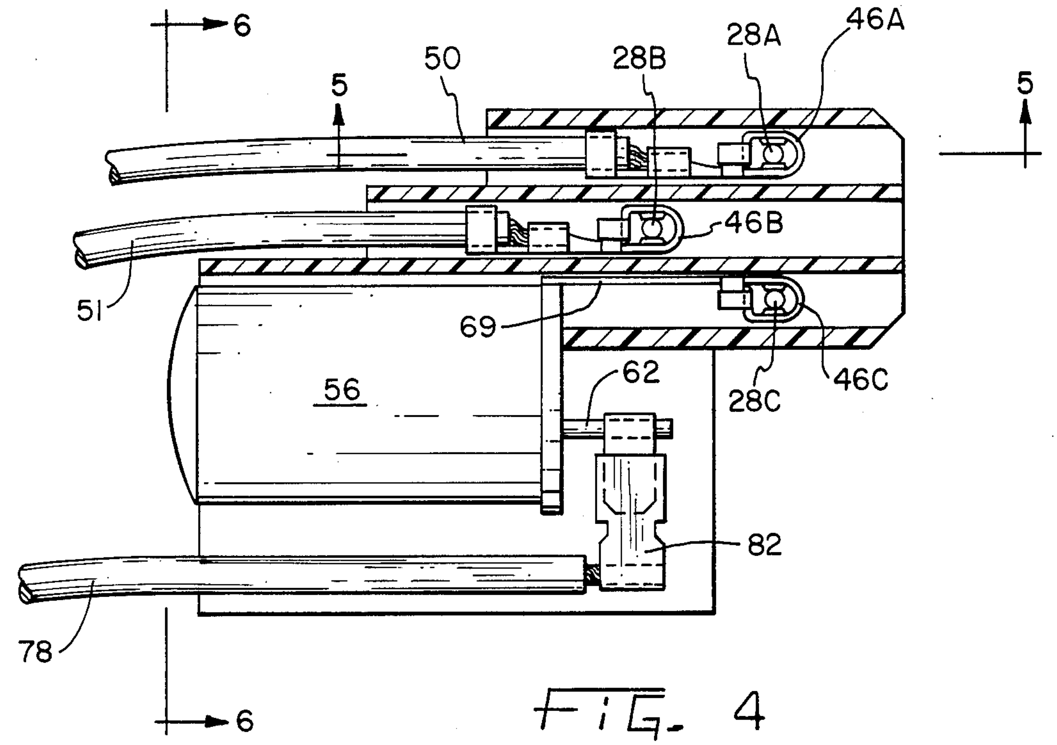
FIG. 4 is an enlarged plan view, partially in cross section, of the compressor terminal block and overload protector holder assembly of FIG. 1.
Figure 6:
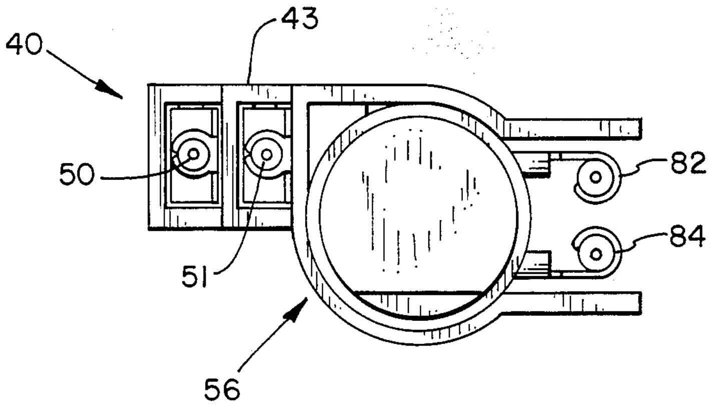
FIG. 6 is a cross sectional view of the terminal block and overload protector holder taken along lines 6—6 of FIG. 4.

Referring to FIGS. 1-3, a hermetic compressor is shown including a casing 12. Such hermetic compressors are well known in the prior art and need not be further described herein. The compressor includes a motor 14 having a stator 16 with start and run windings indicated at 18. Rotor 20 is secured to crankshaft 22 for driving the compressor. Compressed refrigerant is discharged into the casing 12 from a compressor unit (now shown) and from there is discharged to a conventional condensor (not shown) by way of discharge tube 24. The compressed refrigerant flows over substantially the entire motor windings on its path from the compressor unit to the discharge tube 24, and in the process cools the motor windings 18. A terminal pin assembly 26 is also provided having three terminal pins 28*a*, 28*b* and 28*c* as best shown in FIG. 1.

Terminal pin assembly 26 is conventional and may be as described in U.S. Pat. No. 4,252,394 which patent is assigned to the assignee of the present invention.

Figure 5:
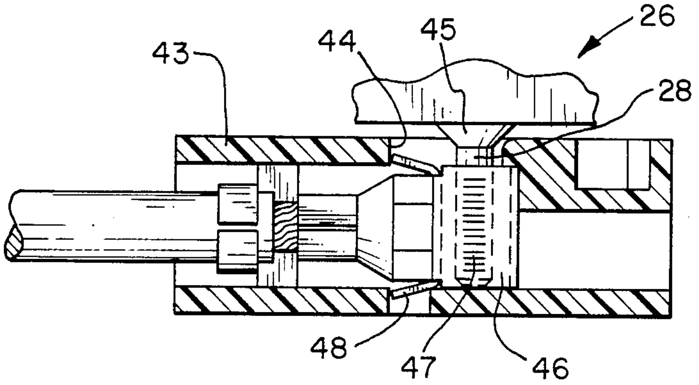
FIG. 5 is a cross sectional view of the terminal block and overload protector holder taken along lines 5—5 of FIG. 4.

Referring further to FIG. 1, a terminal block and overload protector holder 40 is provided including a housing 42 having a top wall 43. Wall 43 includes three elongated slots 44*a*, 44*b* and 44*c*. Terminal block 40 is assembled to terminal pin assembly 26 by sliding the same onto pins 28*a*, 28*b* and 28*c*. As best seen in FIG. 5, each of pins 28*a* and 28*b* are retained in a respective clip 46*a* and 46*b* which serves as a terminal for electrical leads 50 and 51. The inside walls of clips 46 are provided with knurls or serrations which grip pins 28 for greater frictional engagement therewith thereby ensuring that good electrical contact is made with pins 28. Clips 46*a* and 46*b* are also provided with a pair of tabs 48 which engage with two wall portions of housing 42, thereby preventing clips 46 from being pulled out of housing 42. Leads 50 and 51 are respectively connected to first ends of start and run windings 52 and 54 illustrated schematically in FIG. 1 and as shown at 18 in FIG. 3.

A motor protector 56 is housed within the terminal block and overload protector holder 40. Motor protector 56 may be a conventional protector such as Klixon 15 HM Model supplied by Texas Instruments Company of Attleboro, Mass. Motor protector 56, as best seen in FIG. 1, includes a housing 58 made of a conductive metal. A pair of conductive pins 60 and 62 extend from an insulated end of housing 58. Pin 60 is connected to a quick connect terminal 64 and pin 62 is connected to a quick connect terminal 66. Clip 46*c* is welded to housing 58 by means of leg 69. Pin 62 is directly connected to a bi-metal conductor 70. Pin 60 is also connected to bi-metal conductor 70 by way of a heater wire 72 and a contact 74 which is securely connected, such as by welding, to the bi-metal conductor 70 and heater wire 72. Bi-metal 70 is normally shorted to housing 58 by means of a pair of normally closed contacts 76. When bi-metal 70 is heated to a preselected temperature, contacts 76 open and disconnect housing 58 from bi-metal 70. Thus, when contacts 76 are open, terminals 64 and 66 will be disconnected from clip 46*c*. In normal operation, clip 46*c* is electrically connected to terminals 64 and 66. As best seen in FIG. 1, a pair of leads 78 and 80 respectively connect terminals 64 and 66 to windings 54 and 52 by way of terminals of 82 and 84. Thus protector 56 serves to disconnect windings 52 and 54 from the source of electrical energy when an excessive temperature and/or current is sensed by protector 56.

In the assembly of terminal block and overload holder 40 overload protector 56 is first slipped into the housing 42. Clips 46*a* and 46*b* are inserted into the connector block 40. The entire connector block is then slid onto terminal pins 28*a*, 28*b* and 28*c*. Lastly, leads 78 and 80 are connected to quick connect terminals 64 and 66 by pushing terminals 82 and 84 thereonto. Thus, only four leads are used to connect the terminal block and the motor protector to the motor windings. The common terminal for the motor protector is connected directly to terminal pins 28*c*.

Run winding 52 is normally connected through pin 28*a*, clip 46*a*, lead 50, lead 80, terminal 84, terminal 66, heater 72, bi-metal 70, contacts 76, and a common terminal 46*c* to pin 28*c*. Furthermore, start winding 54 is normally connected through pin 28*b*, clip 46*b*, lead 51, lead 78, terminal 82, terminal 64, bi-metal 70, contact 76 and clip 46*c* to pin 28*c*. If the temperature of the compressed refrigerant which flows over protector 56 exceeds a predetermined limit such as, for instance, 160° C., bi-metal contacts 76 will open and the run and start windings 52, 54, will be disconnected from the power supply. In the same fashion, if the current carried through run winding 52 exceeds a predetermined limit, heater 72 will heat up causing the bi-metal contacts 76 to open, thereby disconnecting the run winding 52.

It should be noted that, since the entire assembly 40 is located in the flow of compressed refrigerant gas after the gas has cooled motor windings 18, that the temperature sensed by protector 56 is a good indication of the average temperature of the gas, and therefore of the motor windings. Further, by mounting protector 56 in housing 42 the protector is shielded from direct contact with spikes of hot gas. The protector 56 therefore senses the average temperature of compressed refrigerant.

While this invention has been described as having a preferred design, it will be understood that it is capable of further modification. This application is therefore intended to cover any variations, uses, or adaptations of the invention following the general principles thereof and including such departures from the present disclosure as come within known or customary practice in the art to which this invention pertains and fall within the limits of the appended claims.

What is claimed is:

1. A hermetic compressor for a refrigeration system comprising:

a casing;

an electric motor having run and start windings mounted in said casing;

a terminal pin assembly secured to said casing and having a plurality of pins extending through a wall of said casing;

a terminal block including a plurality of apertures and having said plurality of pins respectively extending therethrough, said terminal block disposed in said casing;

first and second connector clips disposed in said terminal block and being removeably secured to a first and second of said pins;

first and second leads respectively connecting said first and second connector clips to respective first ends of said run and start windings;

a motor protector disposed in said terminal block;

a third connector clip disposed in said terminal block and secured to said motor protector for electrical contact therewith, said third connector clip being removeably secured to a third of said pins;

first and second push on terminals connected to said motor protector; and third and fourth leads connecting said first and second push on terminals to the respective second ends of said run and start windings.

2. The assembly according to claim 1 wherein the inner surfaces of said connector clips are knurled for frictionally engaging said three respective terminal pins.

3. The assembly according to claim 1 whrein said motor protector means includes a temperature sensitive bi-metal switch.

4. The assembly according to claim 3 wherein said motor protector includes a resistive heater connected to said first terminal and said bi-metal switch whereby the motor protector is responsive to the current through said run winding.

5. A terminal block and overload protector holder assembly for a hermetic compressor whereby the compressor motor run and start windings may be connected to a source of electric energy, said assembly comprising:

a pin housing having three elongated openings therein with locking means on respective inner surfaces of said openings, and three holes disposed therein in generally perpendicular alignment with respective ones of said openings and adapted to receive respective pins therein;

three connector clips adapted to be connected to respective lead wires and having respective resilient tab means laterally outwardly extending therefrom, each said connector clip being removeably receivable in a respective said elongated opening and securable therein when its said tab means lockingly engages said locking means of respective said openings;

each said connector clip having a pin receiving slot in alignment with a respective said opening when each said connector clip is removeably secured in a respective said opening, and a pin retaining means in said slot adapted to cut into and frictionally engage and retain one of the pins therein, whereby the pins are frictionally retained in respective ones of said connector clips while minimizing the reduction of electrical surface contact between the pins and respective said connector clips;

said pin retaining means comprising at least two diametrically opposed contact surface areas on the inner surface of said slot, axially aligned with a pin axis, each opposed contact surface area having a plurality of closely spaced knurls thereon, each knurl comprising a continuous linear raised portion extending substantially perpendicularly to the axial direction of the respective slot, thereby providing a plurality of electrical line contacts between said contact surface areas and said pins, said pin retaining means further comprising a connecting surface area contiguous to and interconnecting said two contact areas;

motor protector holder means secured to said pin housing and integral therewith;

motor protector means secured in said housing, said protector means being responsive to a predetermined temperature of a compressor motor for interrupting the supply of electrical power to the compressor run and start windings;

one of said connector clips being secured to said motor protector;

first and second terminals electrically connected to said motor protector and adapted for respective connection to the motor run and start windings.

6. The assembly according to claim 5 wherein said motor protector means includes a temperature sensitive bi-metal switch, a resistive heater connected to said first terminal and said bi-metal switch, whereby the motor protector is responsive to the current through said run winding.

7. A hermetic compressor for a refrigeration system comprising:

a casing;

an electric motor having run and start windings mounted in said casing;

a discharge tube having one open end extending into said housing for conducting compressed refrigerant from said casing;

a terminal pin assembly secured to said casing and having a plurality of pins extending through a wall of said casing;

a terminal block including a plurality of apertures and having said plurality of pins respectively extending therethrough, said terminal block disposed in said casing adjacent said discharge tube;

first and second connector clips disposed in said terminal block and being removeably secured to a first and second of said pins;

first and second leads respectively connecting said first and second connector clips to respective first ends of said run and start windings;

a motor protector disposed in said terminal block;

a third connector clip disposed in said terminal block and secured to said motor protector for electrical contact therewith, said third connector clip being removeably secured to a third one of said pins;

first and second push on terminals connected to said motor protector; and third and fourth leads connecting said first and second push on terminals to the respective second ends of said run and start windings, whereby said motor protector is exposed to refrigerant gas after said gas has passed over substantially said entire motor run and start windings.

8. The compressor according to claim 7 wherein the inner surfaces of said connector clips are knurled for frictionally engaging said respective terminal pins.

9. The compressor according to claim 7 wherein said motor protector means includes a temperature sensitive bi-metal switch.

10. The compressor according to claim 9 wherein said motor protector includes a resistive heater connected to said first push-on terminal and said bi-metal switch, whereby the motor protector is responsive to the current through said run winding.

* * * * *